(12) United States Patent
Foo et al.

(10) Patent No.: US 7,903,639 B2
(45) Date of Patent: Mar. 8, 2011

(54) SYSTEM AND METHOD FOR SELECTIVELY INTERFACING DIFFERENT TYPES OF NETWORK COMMUNICATIONS

(75) Inventors: Ian Foo, Raleigh, NC (US); Armin Current, Danville, NH (US); Kenneth Durazzo, San Ramon, CA (US)

(73) Assignee: Cisco Technologies, Inc., San Jose, CA (US)

( * ) Notice: Subject to any disclaimer, the term of this patent is extended or adjusted under 35 U.S.C. 154(b) by 352 days.

(21) Appl. No.: 11/388,477

(22) Filed: Mar. 24, 2006

(65) Prior Publication Data
US 2007/0223444 A1   Sep. 27, 2007

(51) Int. Cl.
*H04L 12/66* (2006.01)
(52) U.S. Cl. ......... 370/352; 370/349; 370/401; 370/464; 370/466; 370/467; 709/219; 709/230; 709/231; 709/245; 709/246; 455/412.1; 455/414.1; 455/414.4; 455/415; 455/424
(58) Field of Classification Search ............... 455/414.1, 455/414.2, 414.3, 414.4, 466, 415, 424, 425, 455/426; 719/311; 709/202, 203, 219, 230, 709/245, 246, 231, 236; 370/352, 353, 354, 370/355, 356, 349, 401, 395.5, 395.52, 464, 370/465, 466, 467, 471, 474
See application file for complete search history.

(56) References Cited

U.S. PATENT DOCUMENTS

| | | | |
|---|---|---|---|
| 6,493,558 B1* | 12/2002 | Bernhart et al. | 455/466 |
| 6,940,847 B1* | 9/2005 | Glitho et al. | 370/352 |
| 6,961,330 B1* | 11/2005 | Cattan et al. | 370/352 |
| 7,003,305 B2* | 2/2006 | Urs | 455/466 |
| 7,016,359 B2* | 3/2006 | Naim et al. | 370/401 |
| 7,103,348 B1* | 9/2006 | Levit et al. | 455/412.1 |
| 7,167,710 B2* | 1/2007 | Thakkar et al. | 455/450 |

(Continued)

FOREIGN PATENT DOCUMENTS
EP   1227646 A1   7/2002

OTHER PUBLICATIONS

"Google Talk", Aquired at: http://www.google.com/talk/ 1 page, Copyright © 2006, Google.

(Continued)

*Primary Examiner* — Charles N Appiah
*Assistant Examiner* — Olumide T Ajibade-Akonai
(74) *Attorney, Agent, or Firm* — Fish & Richardson P.C.

(57) ABSTRACT

A system for interfacing different types of network communications. In one embodiment, the system includes one or more gateways capable of converting messages from messages that are adapted for a first type of network and/or destination device to messages that are adapted for a second type of network and/or destination device. The second type of network and/or destination device includes a first Voice Over Internet Protocol (VOIP) communications device. A message-analysis module is adapted to employ an address associated with the message to selectively forward the message to one or more of the one or more gateways and/or to a destination device. In a more specific embodiment, the first type of network includes a packet-switched network in communication with the first VOIP phone. The destination device includes a mobile phone in communication with a cellular network. In the specific embodiment, the first type of destination device includes a user option to selectively transition a text-based communications session to a voice-based communications session.

29 Claims, 5 Drawing Sheets

U.S. PATENT DOCUMENTS

| | | | |
|---|---|---|---|
| 7,180,527 B2* | 2/2007 | Sakai et al. | 345/629 |
| 7,221,951 B2* | 5/2007 | Anvekar et al. | 455/466 |
| 7,519,042 B2* | 4/2009 | Gorday et al. | 370/347 |
| 7,796,745 B2* | 9/2010 | Gerhardt et al. | 379/218.01 |
| 2002/0055350 A1* | 5/2002 | Gupte et al. | 455/412 |
| 2002/0097692 A1* | 7/2002 | Ruotoistenmaki | 370/328 |
| 2002/0122401 A1* | 9/2002 | Xiang et al. | 370/338 |
| 2003/0071890 A1* | 4/2003 | McClure | 348/14.03 |
| 2003/0081617 A1 | 5/2003 | Deng | |
| 2003/0097262 A1* | 5/2003 | Nelson | 704/235 |
| 2004/0203942 A1* | 10/2004 | Dehlin | 455/466 |
| 2005/0130657 A1* | 6/2005 | Creamer et al. | 455/436 |
| 2005/0152343 A1* | 7/2005 | Rajagopalan | 370/352 |
| 2005/0197142 A1* | 9/2005 | Major | 455/466 |
| 2005/0198389 A1* | 9/2005 | LaSalle et al. | 709/246 |
| 2007/0116194 A1* | 5/2007 | Agapi et al. | 379/67.1 |

OTHER PUBLICATIONS

Author. Christopher Saunders, "Aim Enterprise Gateway Gets Makeover", article dated Jun. 30, 2003, 3 pages, Copyright © 2006, acquired at www.internetnews.com/ent-news/article.php/2229611.

* cited by examiner

SYSTEM AND METHOD FOR SELECTIVELY INTERFACING DIFFERENT TYPES OF NETWORK COMMUNICATIONS

BACKGROUND OF THE INVENTION

This invention is related in general to networks and more specifically relates to systems and methods for facilitating electronic messaging, such as text messaging and multi-media messaging.

Systems for facilitating text messaging are employed in various demanding applications, including cellular Short Message Services (SMS) text messaging, Multi-Media Services (MMS) text and video messaging, Instant Messaging (IM), and emailing. Such applications often demand versatile user-friendly messaging systems.

Versatile and user-friendly messaging systems are particularly important in increasingly popular SMS and MMS applications. Unfortunately, existing messaging systems often lack support for various important communication options that could increase the versatility and flexibility of accompanying applications.

DETAILED DESCRIPTION OF EMBODIMENTS OF THE INVENTION

A preferred embodiment of the present invention implements a system for interfacing different types of network communications. In one embodiment, the system includes one or more gateways that convert messages from a first type and/or protocol to a second type and/or protocol in preparation for sending to a destination device. The one or more gateways facilitate seamlessly transferring communications between Instant Messaging (IM), Short Message Service (SMS), and Voice-Over-Internet-Protocol (VOIP) systems as needed. The destination device may provide a user option to selectively transition a text-based communications session to a voice-based communications session. Certain embodiments of the present invention may facilitate enabling text messaging, multimedia messaging, multicasting, and transitioning between text and voice, across different types of networks.

For clarity, various well-known components, such as power supplies, modems, firewalls, network cards, Internet Service Providers (ISPs), content switching modules, and so on, have been omitted from the figures. However, those skilled in the art with access to the present teachings will know which components to implement and how to implement them to meet the needs of a given application.

Figure 1:
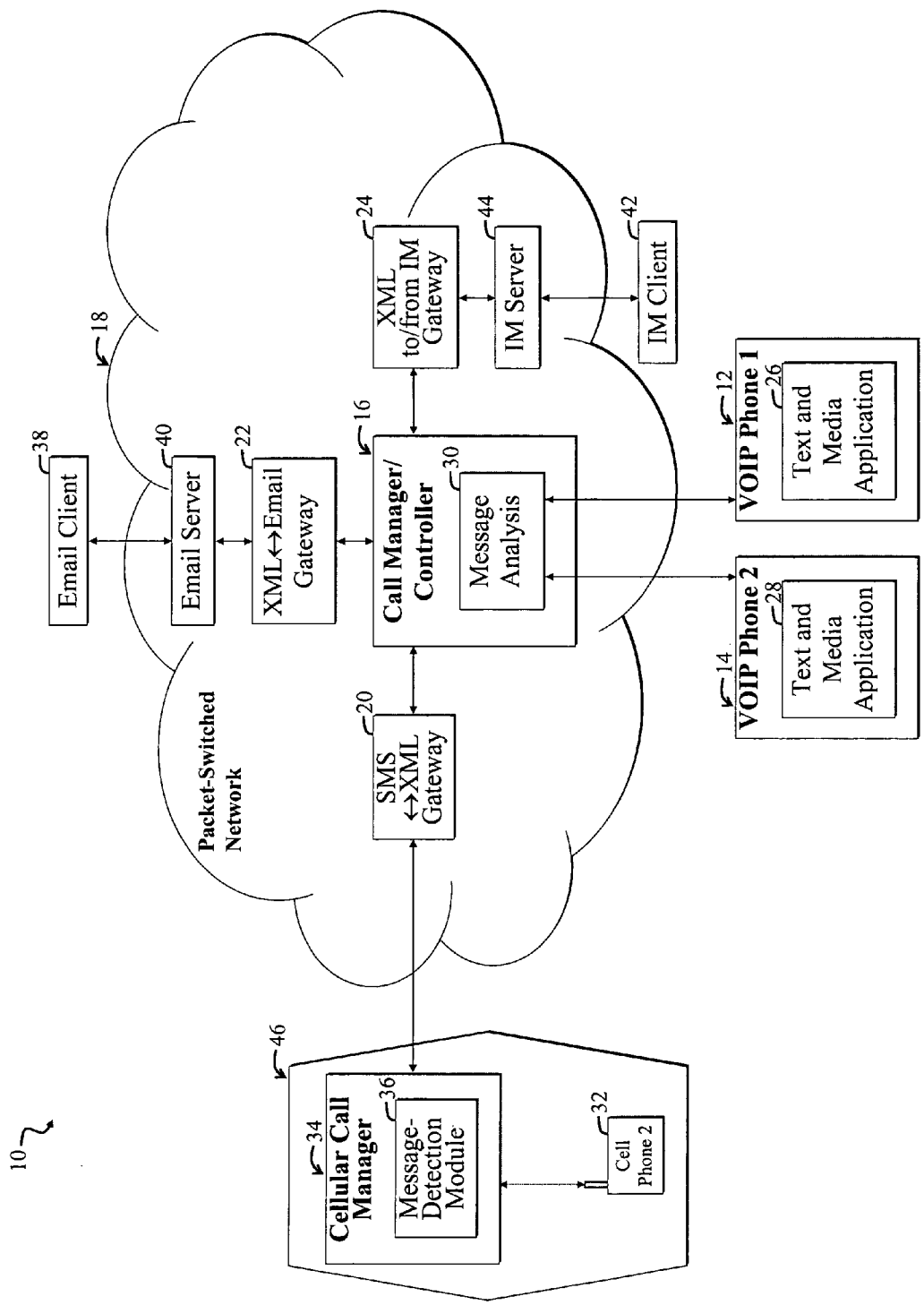
FIG. 1 is a diagram of a network employing a system for interfacing different types of network communications according to an embodiment of the present invention.

FIG. 1 is a diagram of a network employing a system 10 for interfacing different types of network communications according to an embodiment of the present invention. For illustrative purposes, system 10 is shown implemented via a network that includes a first Voice Over Internet Protocol (VOIP) phone 12 and a second VOIP phone 14 that communicate with an adapted call manager 16.

The adapted call manager 16 is included in a packet-switched network 18, such as the Internet. The adapted call manager 16 further communicates with a Short Message Service (SMS)—to/from—eXtensible Markup Language (XML) gateway 20, an XML—to/from—email gateway 22, and an XML—to/from—Instant Messaging (IM) gateway 24, which are included in or communicate with the packet-switched network 18.

The SMS—to/from—XML gateway 20 communicates with a cell phone 32 via a cellular call manager 34, which runs a message-detection module 36. The XML—to/from—email gateway 22 communicates with an email client 38 via an email server 40. The XML—to/from—IM gateway 24 communicates with an IM client 42 via an IM server 44.

The first VOIP phone 12 and the second VOIP phone 14 include a first text/media application 26 and a second text/media application 28, respectively. The adapted call manager 16 includes a message-analysis module 30.

For the purposes of the present discussion, an email message may be any message that is adapted to be sent over a packet-switched network or otherwise employs Simple Mail Transport Protocol (SMTP), Post Office Protocol (POP3), and/or Internet Mail Access Protocols (IMAP) protocols or modifications thereof.

A cellular device may be any device or collection of devices, such as a cellular phone or a pocket computer, which may be employed to wirelessly communicate via a cellular network.

A VOIP device may be any device or collection of devices, such as a computer or phone, that is capable of communicating voice messages via a packet-switched network.

A message may be any portion of information, such as a packet of data. A message often comprises part or all of a communication session between different users and/or devices that are connected to a network. Messaging may be the act of transferring messages between network entities.

A phone may be any device with telephone capabilities. Telephone capabilities may be any type of voice communication capabilities.

A communications device may be any entity, including software and/or hardware that may be employed to facilitate establishing a communications session via a network. A network may be any collection of connected or coupled devices or entities. A network entity may be any thing that is connected to or incorporated within a network, including software, hardware, protocols, stored data, and so on. Hence, a network communications device may be implemented in software without departing from the scope of the present discussion.

A protocol may be any set of instructions or corresponding method that can be used to facilitate communications between one or more entities, such as hardware and/or software modules, devices, or networks. Hence, instructions contained in a particular software module or a network communications device may comprise a protocol.

In operation, the system 10 enables various types of messaging to be exchanged between the various communications devices 12, 14, 32, 38, 42 regardless of whether the message types are originally compatible. The call manager 16 and accompanying gateways 20-24 facilitate selectively interfacing communications between the various devices 12, 14, 32, 38, 42, which may employ different types of communications protocols and message types.

In one operative scenario, the system 10 enables text messaging and/or multimedia messaging to occur between VOIP phones 12, 14. Such messaging is conventionally not available between VOIP phones.

In this scenario, the first VOIP phone 12 may employ Session Initiation Protocol (SIP) to establish an initial connection with the second VOIP phone 14 via the call manager 16. Once the communication session is established, a text message or other message may be transferred from the first VOIP phone 12 over the packet-switched network 18 to the second VOIP phone 14, without transferring the message through the call manager 16.

The first text and media messaging application 26 is adapted to receive text, video, or other multimedia input and then encapsulate the input into an appropriate protocol for forwarding to the second VOIP phone 14. Similarly, the second text and media messaging application 28 running on the second VOIP phone 14 may send text messages or other messages to the first VOIP phone 12 via the packet-switched network 18.

When the first VOIP phone 12 establishes an initial connection with the second VOIP phone 14, information about the messages, such as phone numbers and/or other addresses, and information about the connection to be formed is forwarded to the call manager 16 from the first VOIP phone 12. The message-analysis module 30 may analyze the information and determine that the first VOIP phone 12 would like to send, for example, a text message to the second VOIP phone 14.

The message-analysis module 30 may employ one or more directories and accompanying directory look-up functionality to determine that the second VOIP phone 14 can accommodate the type of message or messages to be sent from the first VOIP phone 12 to the second VOIP phone 14 and that no message-type or protocol conversion is required. Consequently, no additional gateways are needed to transfer the text message from the first VOIP phone 12 to the second VOIP phone 14 via the packet-switched network 18.

The second text and media application 28 running on the second VOIP phone 14 may then receive text messages, such as XML messages, from the first VOIP phone 12. and display them to a user as needed. Those skilled in the art may readily employ various protocols, such as SIP, and message-encapsulating mechanisms, such as XML, to transfer requisite messages between the VOIP hones 12, 14 in accordance with the present teachings.

In a second exemplary operative scenario, the first VOIP phone 12 initiates sending of a text message to the cell phone 32. The first VOIP phone 12 may send an initial text message to the call manager 16. The text message contains destination-location information, such as a destination network address or phone number; origination-location information, such as origination network address or phone number; type information indicating the type of message; and payload containing the contents of the text message. The message-analysis module 30 may selectively enter this information in a directory structure and may further employ the information to determine if the destination location associated with the destination address is currently compatible with the current text message. For the purposes of the present discussion, a destination location may be another network or network entity, such as a communications device.

In the present scenario, the message-analysis module 30 determines, via directory look-up functionality, that the text message from the first VOIP phone 12 is destined for a cellular network 46. Accordingly, routing functionality implemented via the call manager 16 selectively routes the text message to the SMS/MMS—to/from—XML gateway 20.

The SMS/MMS—to—XML gateway 20 converts the XML text message from the first VOIP phone 12 to an SMS message suitable for delivery to the cell phone 32 through the cellular call manager 34. The cellular call manager 34 may be implemented via a Mobile Switching Center (MSC), Mobile Station Manager (MSM), Base station Transceiver Subsystem (BTS) and/or other cellular network infrastructure without departing from the scope of the present invention.

When the cell phone 32 attempts to send a text message, such as an SMS message, to the first VOIP phone 12, a message-detection module 36 running on the cellular call manager 34 determines, via a directory look-up operation, that the SMS message is destined for the packet-switched network 18, employs XML messages to communicate with the first VOIP phone 12. Accordingly, the SMS message is forwarded to the SMS/MMS—to/from—XML gateway 20 for conversion from an SMS message to an XML message. The SMS/MMS—to/from—XML gateway 20 then contacts the call manager 16, which facilitates routing the converted XML message to the first VOIP hone 12.

Similarly, a text message may be sent from the first VOIP phone 12 to the email client 38 and visa versa. In this case, the message-analysis module 30 determines, via a directory look-up operation, that the incoming XML text message from the first VOIP hone 12 is destined for the email client 38. Consequently, the call manager 16 forwards the XML message to the XML—to/from—email gateway 22, which converts the XML text message to an email message. The XML—to/from—email gateway 22 then forwards the email message to the email server 40 in preparation for delivery to the email client 38 via one or more email protocols, such as SMTP, POP3, IMAP.

Similarly, the email client 38 may send an email message to the VOIP phone 12. In this case, the email server 40 or other network entity may employ requisite directory look-up functionality to determine that a given email message from the client 38 is destined to a VOIP phone, such as the first VOIP phone 12, which accepts XML messages. Consequently, the email message is forwarded to the XML—to/from—email gateway 22 in preparation for delivery to the first VOIP phone 12 via the packet switched network 18 and call manager 16.

In another operative scenario, a text message is sent from the first VOIP phone 12 to the IM client 42 via the call manager 16, XML—to—IM gateway 24, and IM server 44. The XML—to—IM gateway 24 may convert from XML messages and SMS/MMS messages to IM messages and suitable IM protocols. Similarly, the IM client 42 may send IM messages to the VOIP phone 12 via the XML—to—IM gateway 24 and the call manager 16.

While only certain specific operative scenarios are discussed with respect to FIG. 1, other operative scenarios are possible. For example, IM messages may be sent from the IM client 42 to the email client 38 and/or to the cell phone 32 after conversion to email messages or to SMS messages, respectively, via the gateways 20-24. Similarly, email messages may be sent from the email client to the cell phone 32 and/or the IM client 42.

The call manager 16 and accompanying message-analysis module 30 may determine the destination of a message based on message type and address and forward the message as needed to the appropriate gateways 20-22 or to the VOIP phones 12, 14 or to other communications devices connected to the packet-switched network 18.

The system 10 is further enhanced by additional functionality built into the VOIP phones 12, 14, via the text and media messaging applications 26, 28. The text and media messaging applications 26, 28 implement one or more routines that enable selective multicasting of messages to various types of devices and further enable seamless transitioning from one type of communication session to another type of communication session, such as from a text-based session to a voice-based communications session as discussed more fully below.

While the present embodiment is discussed with reference to specific protocols and specific message types, embodiments of the present invention are not limited thereto. Other types of protocols and message types may be employed without departing from the scope of the present invention.

While the present embodiment is discussed with reference to various different modules, such as gateways, call managers, and message-analysis modules, such modules may be implemented in separate or similar locations without departing from the scope of the present invention. For example, the gateways 20-24 may be implemented within the call manager 16.

Figure 2:
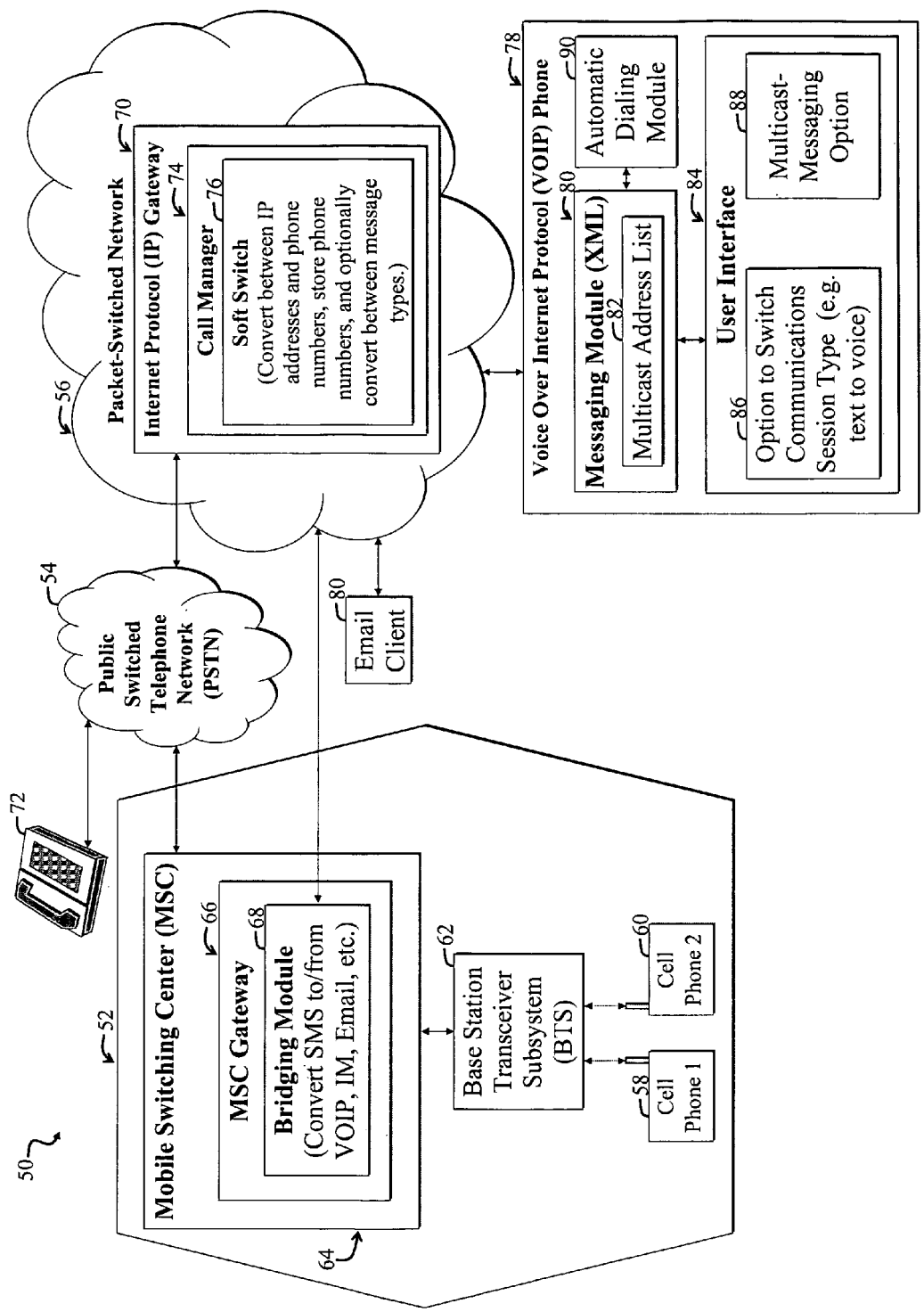
FIG. 2 is a diagram of a network employing a first alternative embodiment of the system of FIG. 1 that employs a multi-function gateway at a cellular Mobile Switching Center (MSC).

FIG. 2 is a diagram of a network employing a first alternative embodiment 50 of the system 10 of FIG. 1. The system 50 includes a cellular network 52 in communication with a packet-switched network 56, which communicates with a Public Switched Telephone Network (PSTN) 54. The cellular network 52 includes a first cell phone 58 and a second cell phone 60, which communicate with a Base station Transceiver Subsystem (BTS) 62. The BTS 62 communicates with a Mobile Switching Center (MSC) 64, which may be implemented via a Mobile Station Manager (MSM). The MSC 64 includes a modified multi-function MSC gateway 66, which runs an MSC bridging module 68. The MSC gateway 66 may be considered a voice gateway that has been modified via addition of the MSC bridging module 68.

The multi-function MSC gateway 66 communicates with the PSTN 54 to facilitate routing calls to wired phones, such as a landline phone 72, which is connected to the PSTN 54. The MSC gateway 66 further communicates with the packet-switched network 54 via Internet Protocol (IP), SIP, and XML messaging and/or other protocols and message types.

The MSC 64 may selectively connect to an IP gateway 70 included in the packet-switched network 56. For illustrative purposes, the IP gateway 70 is shown including a call manager 74, which runs a soft switch 76 for mapping IP addresses to phone numbers and vice versa. The IP gateway 70 in the packet-switched network 56 facilitates interfacing, such as by facilitating initial communications-link setups between the cell phones 58, 60 connected to the cellular network 52, a VOIP phone 78 connected to the packet-switched network 56, the landline phone 72 connected to the PSTN 54, and an email client 80 connected to the packet-switched network 56.

The VOIP phone 78 includes an XML-messaging module 80, which implements various applications, including a multicast-address-list module 82 running on the VOIP phone 78 as discussed more fully below. The VOIP phone 78 further includes an interface module 84, which facilitates implementing a graphical user interface to provide various user options, including a first option 86 to move a given communication session from a text-based communication session to a voice communication session or vice versa. Other types of transitions between one type of communication to another type of communication session may be implemented without departing from the scope of the present invention. Various transitions between voice calls and text-based messaging sessions may be implemented via seamless transitions via a touch of a button or via another selection mechanism afforded via the user interface 84.

The XML messaging module 80 communicates with an automatic-dialing module 90 that is responsive to commands from the interface 84 to automatically call a communications device with which the VOIP phone 78 is currently communicating with via text messaging functionality.

In an exemplary operative scenario, a user of the first VOIP phone 78 multicasts a text-based message to plural communications devices, including the first cell phone 58 and the second cell phone 60. To multicast a text message, the user selects the multicast option 88, which then activates a display for listing addresses 82 to which one or more multicast messages will be sent. When the desired addresses and/or phone numbers are selected by the user of the VOIP phone 78, and a desired message is entered and the user requests to send the message, the XML-messaging module 80 then facilitates establishing initial communications with the appropriate recipients 58, 60 and/or network module 66 via the packet-switched network 56 and the IP gateway 70. Once initial communications have been established, the multicast message from the VOIP phone 78 is sent to the IP gateway 70 where the message is forwarded to the MSC 64. Alternatively, the multicast message is sent along with initial connection-setup information.

The MSC-bridging module 68 deter-mines that the incoming multicast messages are XML messages sent via SIP, and subsequently converts the XML messages to SMS messages, which are then sent by the MSC 64 to the cell phones 58, 60 via the BTS 62.

The cell phones 58, 60 may respond to the message from the VOIP phone 78 with SMS messages, MMS messages, or other types of messages, which are then converted to XML messages via the MSC-bridging module 68 and then delivered to the VOIP phone 78 via the packet-switched network 56.

Hence, in the present operative scenario, a communications session exists between the cell phones 58, 60 and the VOIP phone 78. At a given point during the communication session, a user of the VOIP phone may wish to transition all or a portion of the communication session to voice. If the user wishes to transition the text-based or other media-based communication session and/or conversation to voice, then the user selects the move option 86 of the interface 84. The move option 86 may provide one or more additional options that enable the user to select one or all of the numbers associated with incoming text messages for call back. If the user chooses to initiate a voice call with both the first cell phone 58 and the second cell phone 60, then the XML-messaging module 80 may facilitate implementing a three-way conference call between the VOIP phone 78 and the cell phones 58, 60.

In another operative scenario, the MSC-bridging module 68 and/or the call manager 74 or another network entity may be employed to selectively detect and convert email messages sent from the email client 80 to text messages, such as SMS messages to be sent to one or more of the cell phones 58, 60 or XML messages sent to the VOIP phone 78. Similarly, the MSC-bridging module 68 and/or the call manager 74 may implement functionality to convert text-based SMS, MMS, XML, and/or other types of messages to email messages that are adapted for use with one or more email protocols or modifications thereof.

Those skilled in the art may readily implement requisite functionality described herein with respect to various modules. The functionality may be readily implemented in hardware and/or software without undue experimentation.

Figure 3:
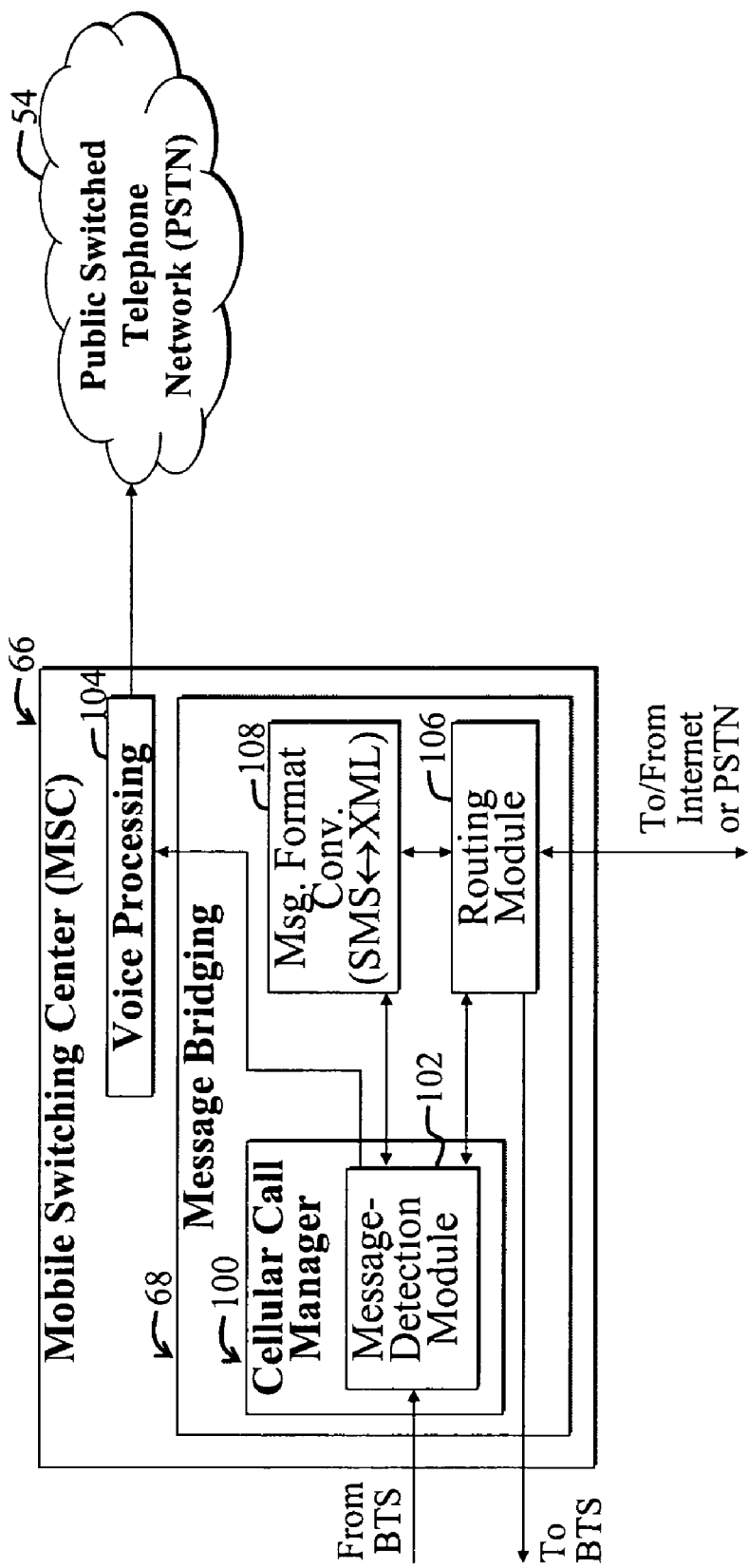
FIG. 3 is a more detailed diagram illustrating exemplary contents of the multi-function gateway of FIG. 3.

FIG. 3 is a more detailed diagram illustrating exemplary contents of the multi-function MSC gateway 66 of FIG. 3. For illustrative purposes, the MSC-bridging module 68 of the multi-function MSC gateway 66 is shown including a cellular call manager 100, which implements a message-type-and-destination-detection module 102.

With reference to FIGS. 2 and 3, the message-type-and-destination-detection module 102 may determine whether an incoming message from the cell phones 58, 60 represents an SMS message intended for delivery via the packet-switched network 56 or to another communications device connected to the cellular network 52 or to a communications device connected to the PSTN 54. If the message or communication is destined for the PSTN 54, then the text-based SMS message is first converted to a voice rendition via a voice processor 104 before it is forwarded to the PSTN 54 for delivery to a communications device, such as the landline phone 72, which is connected to the PSTN 54.

If the SMS message is destined for another communications device, such as a cell phone, in the cellular network 52, then the message-type-and-destination-detection module 102 forwards the message to the appropriate communications device via the BTS 62.

If the SMS message is destined for the packet-switched network 56, then the SMS message is forwarded to a routing module 106 in the MSC-bridging module 68. The routing module 106 selectively employs a message-format-conversion module 108 to change the format and/or type of the message and adjust the protocol employed to send the message as is necessary for delivery to a destination device via the packet-switched network 56.

Similarly, messages received from the packet-switched network by the MSC 66 may be converted by the routing module and message-format-conversion module 108 as needed before forwarding to the appropriate cellular communications device 58, 60.

Figure 4:
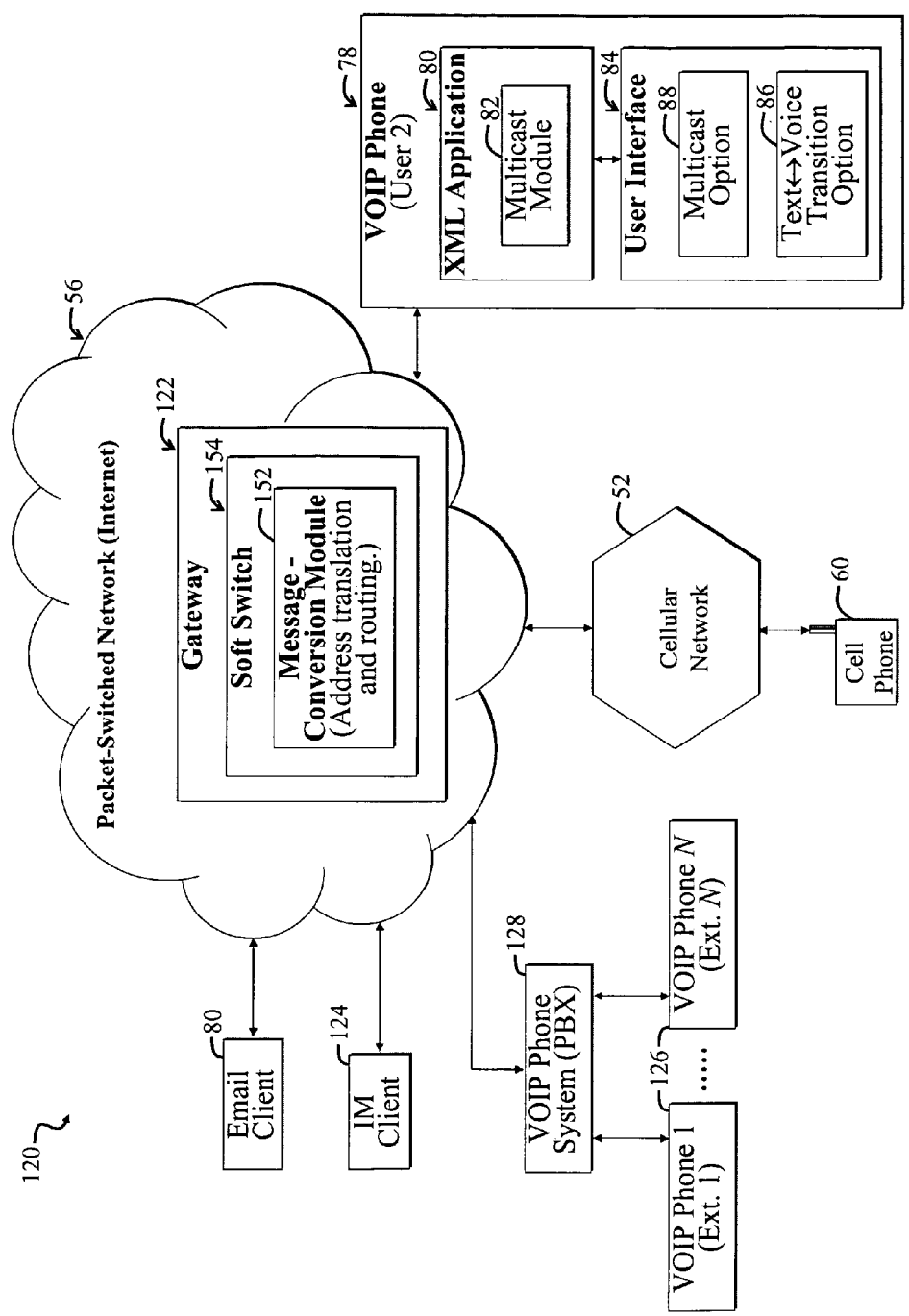
FIG. 4 is a diagram of a network employing a second alternative embodiment of the system of FIG. 1.

FIG. 4 is a diagram of a network employing a second alternative embodiment 120 of the system 10 of FIG. 1. The alternative system 120 represents a relatively centralized implementation wherein a centralized gateway 122 is employed to facilitate message-type conversion via a message-conversion module 152, translation between IP addresses and phone numbers, and routing operations, via a soft switch 154, required to facilitate communications between the VOIP phone 78, the cell phone 60, the email client 80, a user Instant Messaging (IM) client 124, and various VOIP phones 126. The various VOIP phones 126 are connected to the packet-switched network 56 and associated gateway 122 via a local phone system 128, such as a Private Branch eXchange (PBX).

The gateway 122 may be considered a voice gateway that has been modified via the message-conversion module 152 to enable VOIP devices, such as the VOIP phones 78, 126, to exchange SMS messages with SMS-compatible devices, such as the cell phone 60.

In one operative scenario, the VOIP phone 78 and accompanying multicast-address-list module 82 enables multicasting text messages and other types of messages to the various VOIP phones 126 which are associated with similar phone numbers but different extensions. Such functionality may be implemented via modifications to existing VOIP infrastructure. Such modifications may be readily implemented by those skilled in the art with access to the present teachings without undue experimentation.

While the gateway 122 is shown as a centralized entity, the gateway 122 may be dispersed throughout the packet-switched network 56 without departing from the scope of the present invention.

Figure 5:
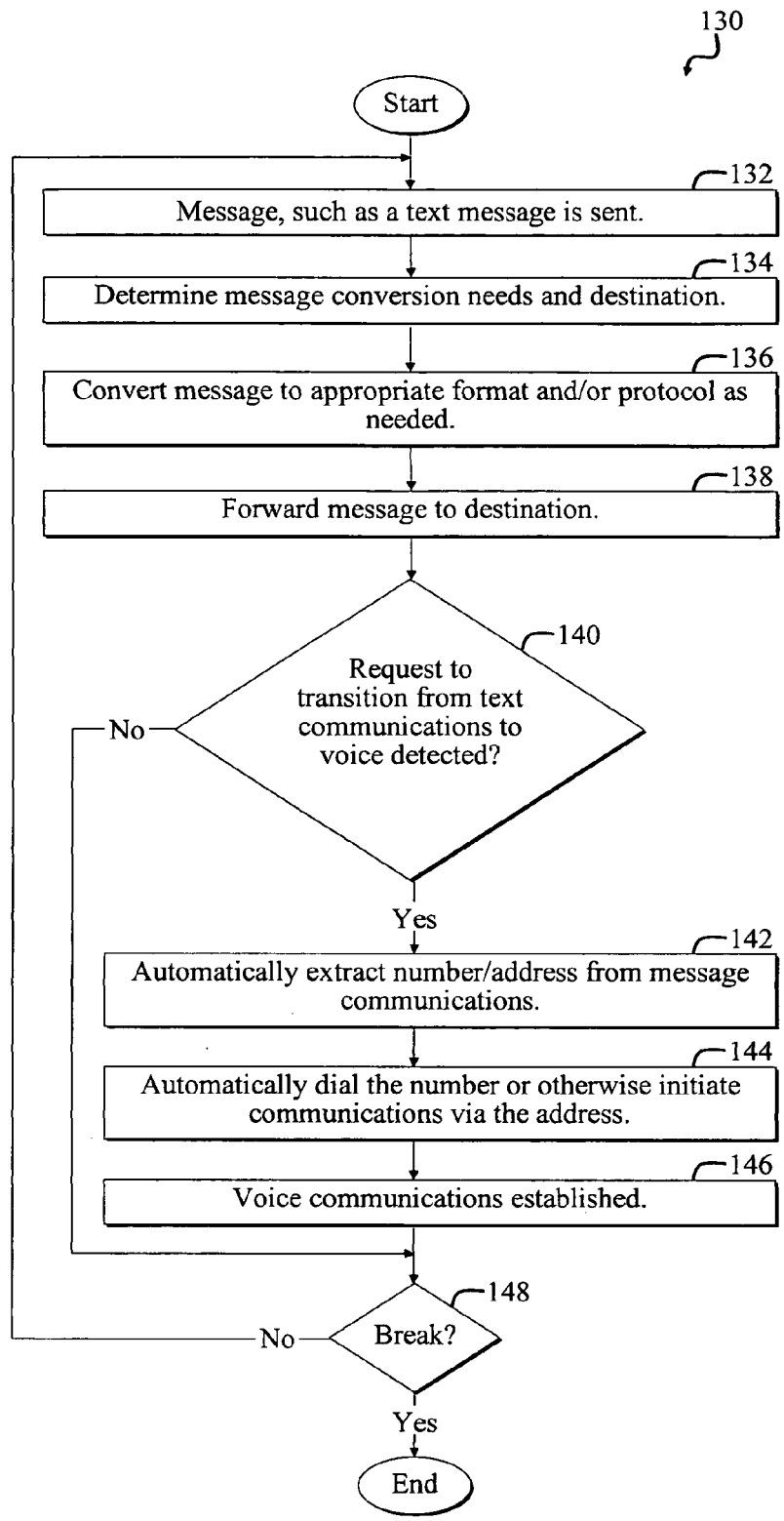
FIG. 5 is a flow diagram of a method suitable for use with the networks of FIGS. 1-4.

FIG. 5 is a flow diagram of a method 130 that is suitable for use with the networks and accompanying system 10, 50, 120 of FIGS. 1-4. The method 130 includes an initial text-message-sending step 132, wherein a text message is sent.

Subsequently, a message-analyzing step 134 is performed, wherein the destination address of the text message and the type of text message is observed and/or analyzed to determine whether the message type and or protocol employed to send the text message will require adjusting before sending to the desired destination address.

Next, a message-converting step 136 is performed. The message-converting step 136 involves converting the message to an appropriate format and/or protocol as needed based on the results of the message-analyzing step 134.

Subsequently, a forwarding step 138 is performed. The forwarding step 138 involves forwarding the message, which has been converted to a required type and/or protocol, to a destination location based on message address and/or phone number information. For the purposes of the present discussion, message address and phone number information are employed interchangeably, since a phone number associated with a message is a type of message address.

Subsequently, a transition-checking step 140 is performed. The transition-checking step 140 involves determining if a user, such as the originator of the message, wishes to transition from text or multimedia message-based communications to voice communications. If a transition-request has been detected, then a transitioning-step 142 is performed. Otherwise, a break-checking step 148 is performed.

The transitioning-step 142 involves automatically extracting phone number information from the message and/or from one or more locations that maintain the phone number associated with the message. The number is then automatically dialed in a dialing step 144. Subsequently voice communications are established in a voice-establishing step 146. Subsequently, the break-checking step 148 is performed.

The break-checking step 148 determines whether a system break has occurred. A system break may occur when a device is turned off, a network is down, or the method 130 must otherwise terminate. If a break is detected, the method 130 completes, otherwise, the message-sending step 132 continues.

Various steps 130-148 of the method 130 may be omitted, changed, or reordered without departing from the scope of the present invention. For example, a multicasting step wherein a user sends a multicast message may be employed. As another example, the method 130 may be replaced with a more generalized method without departing from the scope of the present invention. An exemplary more generalized method involves interfacing different types of network communications by intercepting a communication message, wherein the communication message is characterized by a first message type and a message destination, and then selectively converting the message from the first message type to a second message type as needed based on the message destination and forwarding a second message in response thereto to the message destination.

While the present embodiment has been discussed with respect to specific types of transitions between one type of communication session and another, i.e., between text messaging and voice, other types of transitions may be employed without departing from the scope of the present invention. For example, users communicating between a VOIP phone and email may wish to transition the conversation to a video conferencing session, which may occur without departing from the scope of the present invention.

Although embodiments of the invention are discussed with respect to various types of text messaging, such as SMS messaging, the invention is not limited thereto. Other types of messaging, such as MultiMedia Service (MMS) messaging may be employed without departing from the scope of the present invention. Although specific types of clients have been shown, any other type of client or device capable of supplying text information can be used.

Although embodiments of the invention are discussed primarily with respect to server-client architecture, any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "client", "server", "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time", "offline", in a "batch mode", etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for interfacing different types of network communications, the system comprising:
   one or more gateways capable of converting messages from messages that are adapted for a first type of network and/or device to messages that are adapted for a second type of network and/or device, wherein the second type of network and/or device includes an Internet Protocol (IP) phone;
   a message-analysis module that is adapted to employ an address associated with the message to selectively forward the message to the IP phone using a text-based communication mode, wherein the text-based communication mode does not permit voice communication, the IP phone being configured to display an option on the IP phone to allow a user to move from the text-based communication mode to a voice-based communication mode, wherein the voice-based communication mode permits voice communication;
   a messaging module in the IP phone, the messaging module being adapted to automatically extract phone number information from the message while the IP phone is in the text-based communication mode with a communications device in the first type of network and/or device; and
   an automatic-dialing module in the IP phone, the automatic-dialing module being adapted to automatically initiate a voice-only call to the communications device with which the IP phone is in communication in the text-based communication mode using the automatically extracted phone number information, and in response to the user option selection of moving to the voice-based communication mode such that the user communicates via the initiated voice-only call without text conversion.

2. The system of claim 1, wherein the text-based communication mode includes a Short Message Services (SMS) protocol.

3. The system of claim 1, wherein the second type of network includes a cellular network.

4. The system of claim 1, wherein the message-analysis module is implemented via a call manager.

5. The system of claim 1, wherein the one or more gateways includes a Short Message Service (SMS) to eXtensible Markup Language (XML) gateway.

6. The system of claim 1, wherein the one or more gateways includes an SMS-to-email gateway.

7. The system of claim 1, wherein the one or more gateways includes an SMS-to-IM gateway.

8. The system of claim 1, wherein the message in the text-based communication mode comprises a multicast message.

9. The system of claim 1, wherein an eXtensible Markup Language (XML) application is used for the automatic extraction of the phone number from the message in the text-based communication mode.

10. A system for interfacing different types of network communications, the system comprising:
    means for intercepting a communication message, wherein the communication message is characterized by a first message type and/or format and a message destination;
    means for selectively converting the message from the first message type and/or format to a second message type and/or format as needed based on the message destination and forwarding a second message in response thereto to the message destination, wherein the first and second message types and/or formats are adapted for use with an Internet Protocol (IP) phone, the IP phone using a text-based communication mode, wherein the text-based communication mode does not permit voice communication, the IP phone being configured to display an option on the IP phone to allow a user to move from the text-based communication mode to a voice-based communication mode, wherein the voice-based communication mode permits voice communication;
    means for automatically extracting phone number information from the message while the IP phone is in the text-based communication mode with a sending device; and
    means for automatically calling to initiate a voice-only call, the sending device of the message with which the IP phone is in communication in the text-based communication mode using the automatically extracted phone number information, and in response to the user option selection of moving to the voice-based communication mode such that the user communicates via the initiated voice-only call without text conversion.

11. An apparatus for facilitating interfacing different types of network communications, the apparatus comprising:
   a call manager in selective communication with an Internet Protocol (IP) phone via a packet-switched network;
   one or more gateways capable of converting messages from messages that are adapted for a first type of network and/or destination device to messages that are adapted for a second type of network and/or destination device, wherein the IP phone comprises a messaging module adapted to automatically extract phone number information from the message while the IP phone is in the text-based communication mode with a communications device in the first type of network and/or device; and
   a message-analysis module in the call manager, wherein the message analysis module is adapted to employ an address associated with a message to selectively forward the message to the IP phone using a text-based communication mode, wherein the text-based communication mode does not permit voice communication, the IP phone being configured to display an option on the IP phone to allow a user to move from the text-based communication mode to a voice-based communication mode using an automatic-dialing module in the IP phone to initiate a voice-only call using the automatically extracted phone number information, and in response to the user option selection of moving to the voice-based communication mode, wherein the voice-based communication mode permits voice communication via the initiated voice-only call without text conversion.

12. An apparatus for facilitating messaging between communications devices, the apparatus comprising:
   a messaging application running on a first communications device, wherein the messaging application is adapted to output a first type of message based on user input; and
   a message-interfacing application in communication with the messaging application, wherein the message-interfacing application is adapted to selectively convert the first type of message to a second type of message that is compatible with a second communications device, wherein the second communications device includes:
      an Internet Protocol (IP) phone, the IP phone using a text-based communication mode, wherein the text-based communication mode does not permit voice communication, the IP phone being configured to display an option on the IP phone to allow a user to move from the text-based communication mode to a voice-based communication mode, wherein the voice-based communication mode permits voice communication;
      a messaging module in the IP phone, the messaging module being adapted to automatically extract phone number information from the message while the IP phone is in the text-based communication mode with the first communications device;
      an automatic-dialing module in the IP phone, the automatic-dialing module being adapted to automatically initiate a voice-only call to the first communications device with which the IP phone is in communication in the text-based communication mode using the automatically extracted phone number information, and in response to the user option selection of moving to the voice-based communication mode such that the user communicates via the initiated voice-only call without text conversion; and
      a routing module capable of forwarding the second type of message to the second communications device.

13. The apparatus of claim 12, wherein the message-interfacing application includes a call manager in communication with one or more gateways.

14. The apparatus of claim 13, wherein the one or more gateways includes a Short Message Service (SMS) to eXtensible Markup Language (XML) gateway.

15. The apparatus of claim 13, wherein the one or more gateways includes an SMS-to-email gateway.

16. The apparatus of claim 13, wherein the one or more gateways includes an SMS-to-IM gateway.

17. The apparatus of claim 13, wherein the first type of message is characterized by a first protocol.

18. The apparatus of claim 17, wherein the first type of message is characterized by a first format.

19. The apparatus of claim 18, wherein the first protocol includes Session Initiation Protocol (SIP).

20. The apparatus of claim 19, wherein the first format includes eXtensible Markup Language (XML).

21. The apparatus of claim 17, wherein the second type of message is characterized by a second protocol.

22. The apparatus of claim 21, wherein the second type of message is characterized by a second format.

23. The apparatus of claim 22, wherein the second format includes Short Message Service (SMS) and/or Multimedia Messaging Service (MMS) message format.

24. The apparatus of claim 12, wherein the message-interfacing application includes a voice gateway.

25. The apparatus of claim 24, wherein the message-interfacing application includes one or more routines for enabling reception and transmission of one or more SMS messages.

26. The apparatus of claim 25, wherein the voice gateway is adapted to communicate with one or more Voice Over Internet Protocol (VOIP) phones via an XML application.

27. Previously Presented) The apparatus of claim 26, wherein the XML application is adapted to translate messages between SMS and XML formats.

28. A method for interfacing different types of network communications, the method comprising:
   intercepting a communication message, wherein the communication message is characterized by a first message type and/or format and a message destination;
   selectively converting the message from the first message type and/or format to a second message type and/or format as needed based on the message destination and forwarding a second message in response thereto to an Internet Protocol (IP) phone using a text-based communication mode, wherein the text-based communication mode does not permit voice communication, the IP phone displaying an option on the IP phone to allow a user to move from the text-based communication mode to a voice-based communication mode, wherein the voice-based communication mode permits voice communication;
   automatically extracting phone number information from the message while the IP phone is in the text-based communication mode with a sending device; and
   automatically calling to initiate a voice-only call, the sending device of the message with which the IP phone is in communication in the text-based communication mode using the automatically extracted phone number information, and in response to the user option selection of moving to the voice-based communication mode such that the user communicates via the initiated voice-only call without text conversion.

29. A non-transitory computer-readable storage medium including instructions executable by a computer processor for:
- intercepting a communication message, wherein the communication message is characterized by a first message type and/or format and a message destination;
- selectively converting the message from the first message type and/or format to a second message type and/or format as needed based on the message destination and forwarding a second message in response thereto to an Internet Protocol (IP) phone using a text-based communication mode, wherein the text-based communication mode does not permit voice communication, the IP phone displaying an option on the IP phone to allow a user to move from the text-based communication mode to a voice-based communication mode, wherein the voice-based communication mode permits voice communication;
- automatically extracting phone number information from the message while the IP phone is in the text-based communication mode with a sending device; and
- automatically calling to initiate a voice-only call, the sending device of the message with which the IP phone is in communication in the text-based communication mode using the automatically extracted phone number information, and in response to the user option selection of moving to the voice-based communication mode such that the user communicates via the initiated voice-only call without text conversion.

* * * * *